United States Patent
Byun et al.

(10) Patent No.: US 12,112,266 B2
(45) Date of Patent: Oct. 8, 2024

(54) METHOD FOR PROCESSING ELASTIC WAVE DATA, ELASTIC WAVE PROCESSING DEVICE USING SAME, AND PROGRAM THEREFOR

(71) Applicant: IUCF-HYU (INDUSTRY-UNIVERSITY COOPERATION FOUNDATION HANYANG UNIVERSITY), Seoul (KR)

(72) Inventors: Joong Moo Byun, Seoul (KR); Dae Ung Yoon, Seoul (KR); Ji Ho Park, Gyeonggi-do (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 925 days.

(21) Appl. No.: 17/264,356

(22) PCT Filed: Sep. 7, 2018

(86) PCT No.: PCT/KR2018/010515
§ 371 (c)(1),
(2) Date: Jan. 29, 2021

(87) PCT Pub. No.: WO2020/027365
PCT Pub. Date: Feb. 6, 2020

(65) Prior Publication Data
US 2021/0304004 A1    Sep. 30, 2021

(30) Foreign Application Priority Data
Jul. 31, 2018  (KR) .......................... 10-2018-0089515

(51) Int. Cl.
*G06N 3/04* (2023.01)
*G06N 3/044* (2023.01)
*G06N 3/08* (2023.01)

(52) U.S. Cl.
CPC ............... *G06N 3/08* (2013.01); *G06N 3/044* (2023.01)

(58) Field of Classification Search
None
See application file for complete search history.

(56) References Cited

PUBLICATIONS

Jia, Yongna, and Jianwei Ma. "What can machine learning do for seismic data processing? An interpolation application." Geophysics 82.3 (2017): V163-V177. (Year: 2017).*

(Continued)

*Primary Examiner* — Hal Schnee
(74) *Attorney, Agent, or Firm* — Sughrue Mion, PLLC

(57) ABSTRACT

Provided is a method of processing elastic wave data, the method including selecting some elastic wave traces as a first label from among a plurality of elastic wave traces received without at least some elastic wave traces missing from whole elastic wave data, training an interpolation model on a machine learning basis by using at least two or more of remaining elastic wave traces except for the first label and the first label, restoring the at least some elastic wave traces missing from the whole elastic wave data by using the trained interpolation model, training an extrapolation model on a machine learning basis by using an elastic wave trace selected as a second label from among a plurality of elastic wave traces included in whole restored elastic wave data and at least two or more of remaining elastic wave traces except for the second label, and generating an additional elastic wave trace, which have not been included in the whole elastic wave data, by using the trained extrapolation model.

14 Claims, 14 Drawing Sheets

(56) References Cited

PUBLICATIONS

Liang, Jingwei, Jianwei Ma, and Xiaoqun Zhang. "Seismic data restoration via data-driven tight frame." Geophysics 79.3 (2014): V65-V74. (Year: 2014).*

Ovcharenko Oleg et al, "Neural network based low-frequency data extrapolation", King Abdullah University of Science and Technology, Dec. 2017, 3 pages.

Zhu Lingchen et al, "Joint Seismic Data Denoising and Interpolation with Double-Sparsity Dictionary Learning", Georgia Institute of Technology, Mar. 2017, 17 pages.

International search report for PCT/KR2018/010515 dated Apr. 22, 2019.

* cited by examiner

METHOD FOR PROCESSING ELASTIC WAVE DATA, ELASTIC WAVE PROCESSING DEVICE USING SAME, AND PROGRAM THEREFOR

CROSS REFERENCE TO RELATED APPLICATIONS

This application is a National Stage of International Application No. PCT/KR2018/010515, filed Sep. 7, 2018, which claims priority under U.S.C. § 119(a) to Korean Patent Application No. 10-2018-0089515 filed on Jul. 31, 2018, the contents of which are incorporated herein by reference in their entireties.

TECHNICAL FIELD

The disclosure relates to a method, apparatus, and program for processing elastic wave data, and more particularly, to a method, apparatus, and program for processing elastic wave data by applying machine learning directly to a plurality of elastic wave traces received without at least some elastic wave traces missing from the whole elastic wave data to perform interpolation and extrapolation on the elastic wave data.

BACKGROUND ART

Occasionally, in obtaining elastic wave exploration data, a portion of the data happens to be missing due to mechanical problems, topographical access restriction, or an issue of expenses, and spatial aliasing occurs due to wide receiver spacing, making it difficult to process the data.

DESCRIPTION OF EMBODIMENTS

Technical Problem

The disclosure provides a method, apparatus, and program for processing elastic wave data by applying machine learning directly to a plurality of elastic wave traces received without at least some elastic wave traces missing from the whole elastic wave data to perform interpolation and extrapolation on the elastic wave data.

Solution to Problem

According to an aspect of the disclosure, a method of processing elastic wave data, the method comprising: selecting some elastic wave traces as a first label from among a plurality of elastic wave traces received without at least some elastic wave traces missing from whole elastic wave data; training an interpolation model on a machine learning basis by using at least two or more of remaining elastic wave traces except for the first label and the first label; restoring the at least some elastic wave traces missing from the whole elastic wave data by using the trained interpolation model; training an extrapolation model on a machine learning basis by using an elastic wave trace selected as a second label from among a plurality of elastic wave traces included in whole restored elastic wave data and at least two or more of remaining elastic wave traces except for the second label; and generating an additional elastic wave trace, which have not been included in the whole elastic wave data, by using the trained extrapolation model.

According to an exemplary embodiment, the interpolation model and the extrapolation model are trained based on a machine learning basis by using data itself represented on a time-space domain for each of the plurality of elastic wave traces.

According to an exemplary embodiment, the method further comprises repeatedly training the interpolation model on a machine learning basis by using a plurality of elastic wave traces included in the whole restored elastic wave data.

According to an exemplary embodiment, the training of the interpolation model by using the first label comprises determining a number of elastic wave traces to be selected as the first label based on a number of the at least some elastic wave traces missing from the whole elastic wave data, and training the interpolation model on a machine learning basis by using the elastic wave traces selected as the first label.

According to an exemplary embodiment, the repeatedly training of the interpolation model comprises setting a number of elastic wave traces to be selected as the first label to be larger as the number of the at least some elastic wave traces missing from the whole elastic wave data increases.

According to an exemplary embodiment, the training of the interpolation model comprises training the interpolation model on a machine learning basis by using values at points having a same phase in the at least two or more of the remaining elastic wave traces except for the first label and the first label.

According to an exemplary embodiment, the machine learning is performed by using a recurrent neural network (RNN) or long short-term memory (LSTM) model.

According to an exemplary embodiment, the selecting of the some elastic wave traces as the first label comprises selecting the some elastic wave traces as the first label based on a distance to the elastic wave trace missing from the whole elastic wave data.

According to an exemplary embodiment, the selecting of the some elastic wave traces as the first label comprises selecting the some elastic wave traces as the first label by applying high priority when a distance to the elastic wave trace missing from the whole elastic wave data is short.

According to an exemplary embodiment, the training of the extrapolation model comprises selecting some of the plurality elastic wave traces included in the whole restored elastic wave data as the second label, based on a location of an elastic wave trace to be generated by the extrapolation model.

According to an exemplary embodiment, the method further comprises restoring the at least some elastic wave traces missing from the whole elastic wave data, by using the extrapolation model.

According to an exemplary embodiment, the restoring of the at least some elastic wave traces missing from the whole elastic wave data comprises restoring the at least some elastic wave traces missing from the whole elastic wave data, by using both the interpolation model and the extrapolation model.

According to an exemplary embodiment, the restoring of the at least some elastic wave traces missing from the whole elastic wave data by using both the interpolation model and the extrapolation model comprises restoring the at least some missing elastic wave traces by reflecting respective weights for an elastic wave trace restored using the interpolation model and an elastic wave trace restored using the extrapolation model.

According to an aspect of the disclosure, an apparatus for processing elastic wave data, the apparatus comprising: a label selecting module configured to select some elastic wave traces as a first label from among a plurality of elastic wave traces received without at least some elastic wave traces missing from whole elastic wave data; an interpolation model training module configured to train an interpolation model on a machine learning basis by using at least two or more of remaining elastic wave traces except for the first label and the first label; an elastic wave trace restoring module configured to restore the at least some elastic wave traces missing from the whole elastic wave data by using the trained interpolation model; an extrapolation model training module configured to train an extrapolation model on a machine learning basis by using an elastic wave trace selected as a second label from among a plurality of elastic wave traces included in whole restored elastic wave data and at least two or more of remaining elastic wave traces except for the second label; and an additional elastic wave trace generating module configured to generate an additional elastic wave trace, which have not been included in the whole elastic wave data, by using the trained extrapolation model.

According to an aspect of the disclosure, a program stored in a medium coupled to a processor for performing a method of processing elastic wave data, the program comprises program codes to carry out operations of: selecting some elastic wave traces as a first label from among a plurality of elastic wave traces received without at least some elastic wave traces missing from whole elastic wave data; training an interpolation model on a machine learning basis by using at least two or more of remaining elastic wave traces except for the first label and the first label; restoring the at least some elastic wave traces missing from the whole elastic wave data by using the trained interpolation model; training an extrapolation model on a machine learning basis by using an elastic wave trace selected as a second label from among a plurality of elastic wave traces included in whole restored elastic wave data and at least two or more of remaining elastic wave traces except for the second label; and generating an additional elastic wave trace, which have not been included in the whole elastic wave data, by using the trained extrapolation model.

Advantageous Effects of Disclosure

A method and apparatus according to embodiments of the disclosure may apply machine learning directly to a plurality of elastic wave traces received without at least some elastic wave traces missing from the whole elastic wave data, to significantly reduce the amount of data processing in processing the elastic wave data.

BRIEF DESCRIPTION OF DRAWINGS

The above and other features and advantages of the disclosure will become more apparent by describing in detail exemplary embodiments thereof with reference to the attached drawings in which.

BEST MODE

Various modifications may be made to embodiments of the disclosure, which will be described more fully hereinafter with reference to the accompanying drawings. The disclosure may be embodied in many different forms and should not be construed as limited to the embodiments of the disclosure set forth herein; rather, these embodiments of the disclosure are provided so that the disclosure will be thorough and complete, and will fully convey the scope of the disclosure to those of ordinary skill in the art.

Descriptions of some well-known technologies that possibly obscure the disclosure will be omitted. Ordinal numbers (e.g., first, second, etc.) as herein used are to distinguish components from one another.

When the term "connected" or "coupled" is used, a component may be directly connected or coupled to another component. However, unless otherwise defined, it is also understood that the component may be indirectly connected or coupled to the other component via another new component.

The terms "unit", "device", "~er (~or)", "module", etc., refer to a processing unit of at least one function or operation, which may be implemented by hardware such as a processor, a microprocessor, an application processor, a micro controller, a central processing unit (CPU), a graphics processing unit (GPU), an accelerate processor unit (APU), a digital signal processor (DSP), an application specific integrated circuit (ASIC), a field programmable gate array (FPGA), etc., software, or a combination of hardware and software, which may be implemented in a form combined with a memory for storing data required to handle at least one function or operation.

Throughout the specification, components may be discriminated by their major functions. For example, two or more components as herein used may be combined into one, or a single component may be subdivided into two or more sub-components according to subdivided functions. Each of the components may perform its major function and further perform part or all of a function served by another component. In this way, part of a major function served by each component may be dedicated and performed by another component.

Embodiments of the disclosure will now be described in detail.

Figure 1:
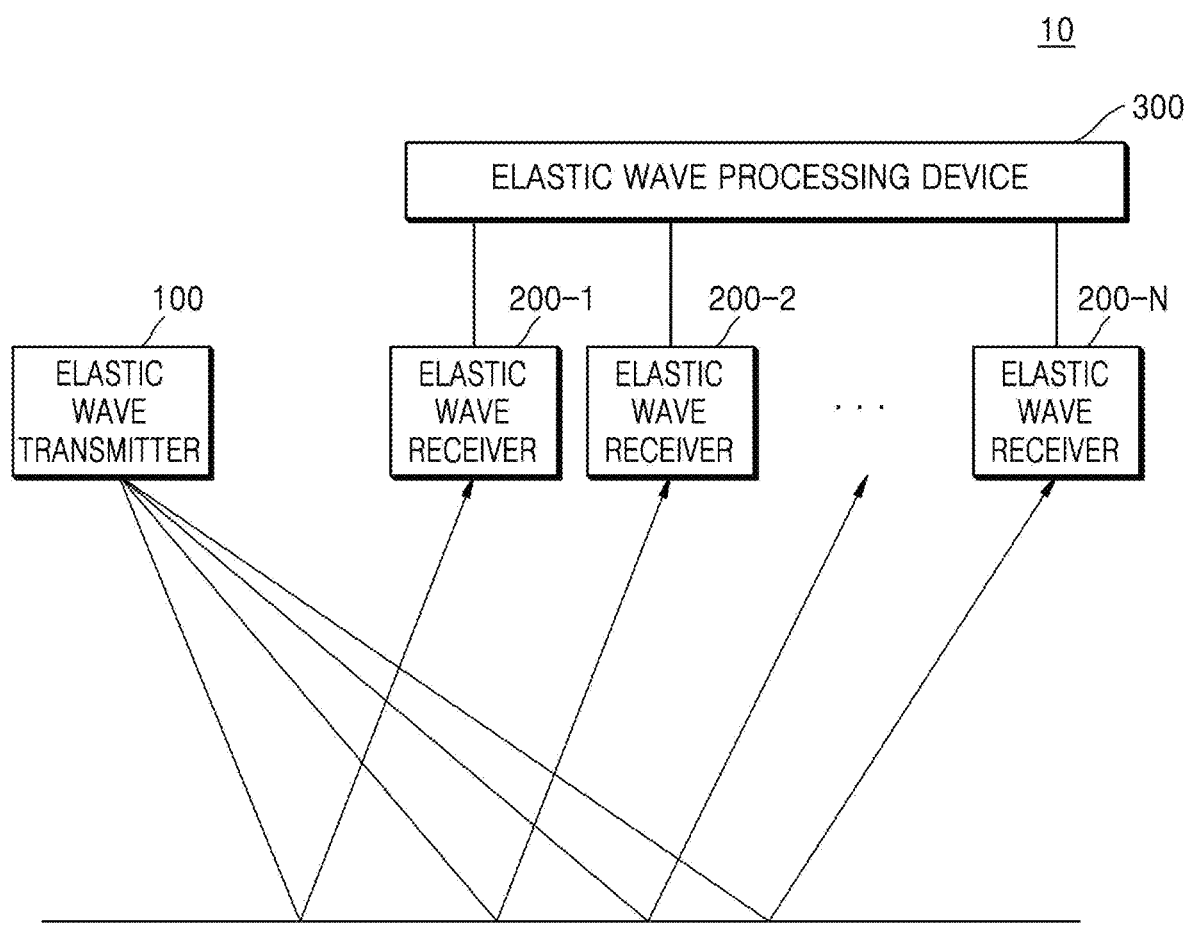
FIG. 1 is a conceptual diagram of an elastic wave processing system, according to an embodiment of the disclosure.

FIG. 1 is a conceptual diagram of an elastic wave processing system, according to an embodiment of the disclosure.

Referring to FIG. 1, an elastic wave processing system 10 may include an elastic wave transmitter 100, a plurality of elastic wave receivers 200-1 to 200-N (where N is an integer equal to or greater than 2), and an elastic wave processing device 300.

The elastic wave processing system 10 is able to determine a geological structure by generating elastic waves on the surface of the earth or on the sea and analyzing a form in which the elastic waves are reflected and returned.

The elastic wave transmitter 100 may be located on the surface of the earth or on the sea for generating elastic waves.

The plurality of elastic wave receivers 200-1 to 200-N may be arranged a certain distance from each other for receiving elastic waves, which had been generated from elastic transmitter 100, reflected and returned.

The plurality of elastic wave receivers 200-1 to 200-N may send elastic wave data about the received elastic waves to the elastic wave processing device 300 for analysis of the received elastic waves.

The elastic wave processing device 300 may receive the elastic wave data collected and sent by the plurality of elastic wave receivers 200-1 to 200-N in an intact state with a plurality of traces included therein.

Figure 2:
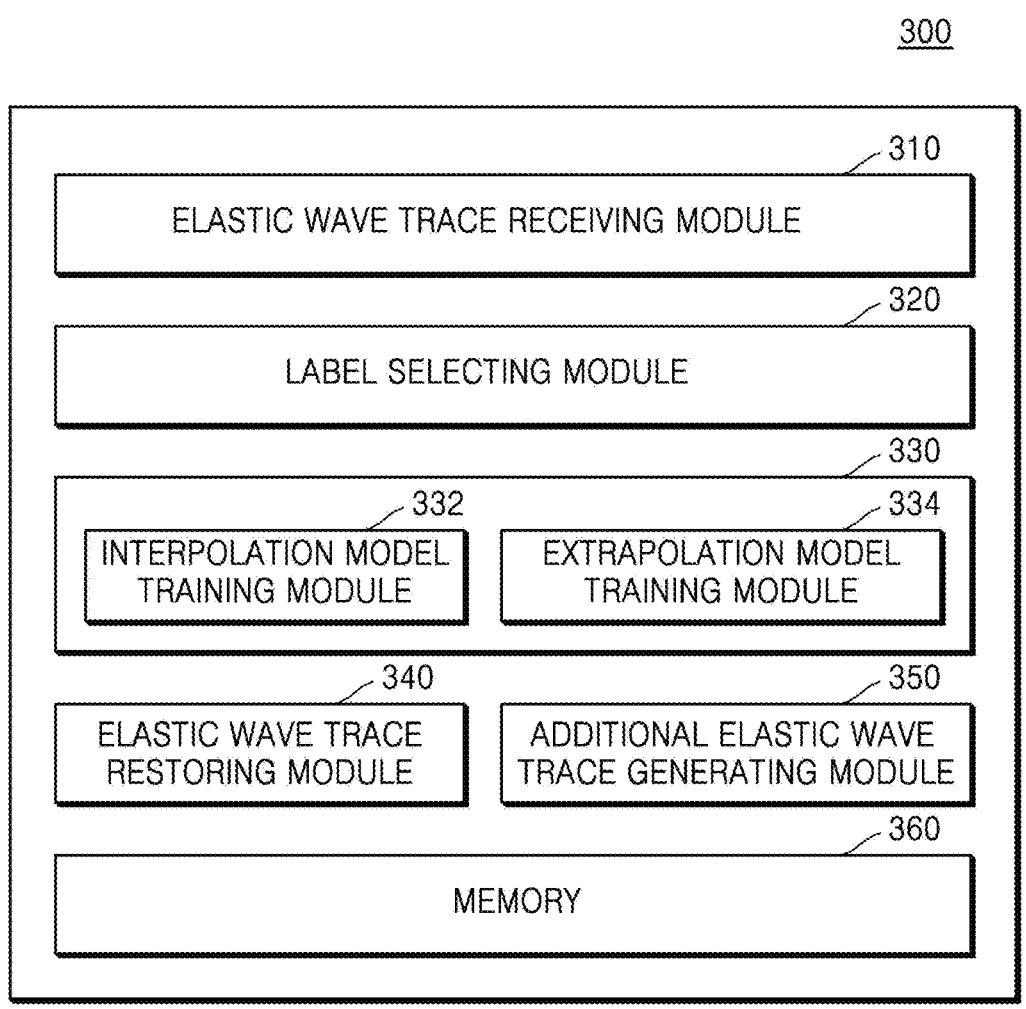
FIG. 2 is a block diagram of an elastic wave processing device shown in FIG. 1, according to an embodiment of the disclosure.

FIG. 2 is a block diagram of the elastic wave processing device 300 shown in FIG. 1, according to an embodiment of the disclosure.

Referring to FIGS. 1 and 2, the elastic wave processing device 300 may include an elastic wave trace receiving module 310, a label selecting module 320, a training module 330, an elastic wave trace restoring module 340, an additional elastic wave trace generating module 350, and a memory 360.

A data processing procedure in the elastic wave processing device 300 may be performed based on hardware, e.g., the memory 360 and a processor (not shown), included in the elastic wave processing device 300. In this case, the elastic wave trace receiving module 310, the label selecting module 320, the training module 330, the elastic wave trace restoring module 340, and the additional elastic wave trace generating module 350 may be implemented as partial functions of the processor. For example, a method of processing elastic wave data in accordance with an embodiment of the disclosure may be implemented with program codes, which may be stored in the memory 360, and the memory 360 may be coupled to the processor to perform a method of processing elastic wave data in accordance with an embodiment of the disclosure.

The elastic wave trace receiving module 310 may receive, from the plurality of elastic wave receivers 200-1 to 200-N, a plurality of elastic wave traces without at least some elastic wave traces missing from the whole elastic wave data.

In an embodiment of the disclosure, the elastic wave receiving module 310 checks the plurality of received elastic wave traces to identify missing elastic wave traces from the whole elastic wave data. In this case, the elastic wave receiving module 310 may identify trace numbers of the missing elastic wave traces, and set the corresponding elastic wave traces as restoration targets.

The label selecting module 320 may select some elastic wave traces as a first label from among the plurality of elastic wave traces received without at least some elastic wave traces missing from the whole elastic wave data.

In an embodiment of the disclosure, the first label selected by the label selecting module 320 may be used in a machine learning based training procedure of an interpolation model of the training module 330.

In an embodiment of the disclosure, the label selecting module 320 may select a plurality of traces as the first label.

In another embodiment of the disclosure, the label selecting module 320 may determine the number of elastic wave traces to be selected as the first label based on the number of elastic wave traces missing from the whole elastic wave data. For example, the more the elastic wave traces are missing from the whole elastic wave data, the larger number of elastic wave traces the label selecting module 320 may select as the first label.

The label selecting module 320 may select some of the plurality of elastic wave traces included in the whole restored elastic wave data as a second label.

In an embodiment of the disclosure, the second label selected by the label selecting module 320 may be used in a machine learning based training procedure of an extrapolation model of the training module 330.

The training module 330 may include an interpolation model training module 332 and an extrapolation model training module 334.

The interpolation model training module 332 may train the interpolation model on a machine learning basis by using at least two or more of the remaining elastic wave traces except for the elastic wave traces selected as the first label, and the first label.

In an embodiment of the disclosure, the machine learning may be performed using e.g., a recurrent neural network (RNN) model or a long short-term memory (LSTM) model, and in addition to the RNN model or the LSTM model, other various supervised learning based machine learning model may be used.

In an embodiment of the disclosure, the interpolation model training module 332 may train the interpolation model on a machine learning basis by using values at points having the same phase of the at least two or more of the remaining elastic wave traces except for the elastic wave traces selected as the first label, and values at the corresponding phase points of the elastic wave traces selected as the first label.

In another embodiment of the disclosure, to train the interpolation model, the interpolation model training module 332 may shift the point to be subject to the machine learning in a temporal sequence, and may repeatedly machine-train the interpolation model using values of elastic wave traces at points corresponding to a phase after the shifting. In this case, the interpolation model training module 332 may change the number of repetition times based on the number of the elastic wave traces missing from the whole elastic wave data, in which case the number of repetition times may be increased with increasing number of missing elastic wave traces.

The extrapolation model training module 334 may train the extrapolation model on a machine learning basis by using the elastic wave traces selected as the second label from among the plurality of elastic wave traces included in the whole elastic wave data restored by the elastic wave trace restoring module 340, and at least two or more of the remaining elastic wave traces except for the elastic wave traces selected as the second label.

In an embodiment of the disclosure, the machine learning may be performed using e.g., a recurrent neural network (RNN) model or a long short-term memory (LSTM) model, and in addition to the RNN model or the LSTM model, other various supervised learning based machine learning model may be used.

In an embodiment of the disclosure, the extrapolation model training module 334 may train the extrapolation model on a machine learning basis by using values at points having the same phase of the at least two or more of the remaining elastic wave traces except for the elastic wave traces selected as the second label, and values at the corresponding phase points of the elastic wave traces selected as the second label.

In another embodiment of the disclosure, to train the extrapolation model, the extrapolation model training module 334 may shift the point to be subject to the machine learning in a temporal sequence, and may repeatedly train the extrapolation model by using values of elastic wave traces at points corresponding to a phase after the shifting. In this case, the extrapolation model training module 334 may change the number of repetition times based on the number of the elastic wave traces missing from the whole elastic wave data, in which case the number of repetition times may be increased with increasing number of missing elastic wave traces.

The elastic wave trace restoring module 340 may restore at least some of the elastic wave traces missing from the whole elastic wave data by using the interpolation model trained by the interpolation model training module 332.

In an embodiment of the disclosure, the elastic wave trace restoring module 340 may restore at least some of the elastic wave traces missing from the whole elastic wave data by using both the interpolation model trained by the interpolation model training module 332 and the extrapolation model trained by the extrapolation model training module 334.

In this case, the elastic wave trace restoring module 340 may finally restore the at least some of the missing elastic wave traces by reflecting weights for the elastic wave traces restored by using the interpolation model and the elastic wave traces restored by using the extrapolation model.

In an embodiment of the disclosure, the weights may be determined according to an extent of succession of the missing elastic wave traces. For example, as the number of successively missing neighboring elastic wave traces increases, the weight for the elastic wave traces restored using the extrapolation model may be higher.

The additional elastic wave trace generating module 350 may additionally generate elastic wave traces that have not been included in the whole elastic wave data received and restored by the elastic wave processing device 300.

The additional elastic wave trace generating module 350 may generate the additional elastic wave traces that have not been included in the whole elastic wave data by applying the extrapolation model trained by the extrapolation model training module 334 to the whole elastic wave data restored by the elastic wave trace restoring module 340.

The memory 360 may store program codes for the elastic wave processing device 300 to perform the method of processing elastic wave data, and data required by the modules 310 to 350 included in the elastic wave processing device 300 to perform the respective operations and data resulting from performing the operations.

Figure 3:
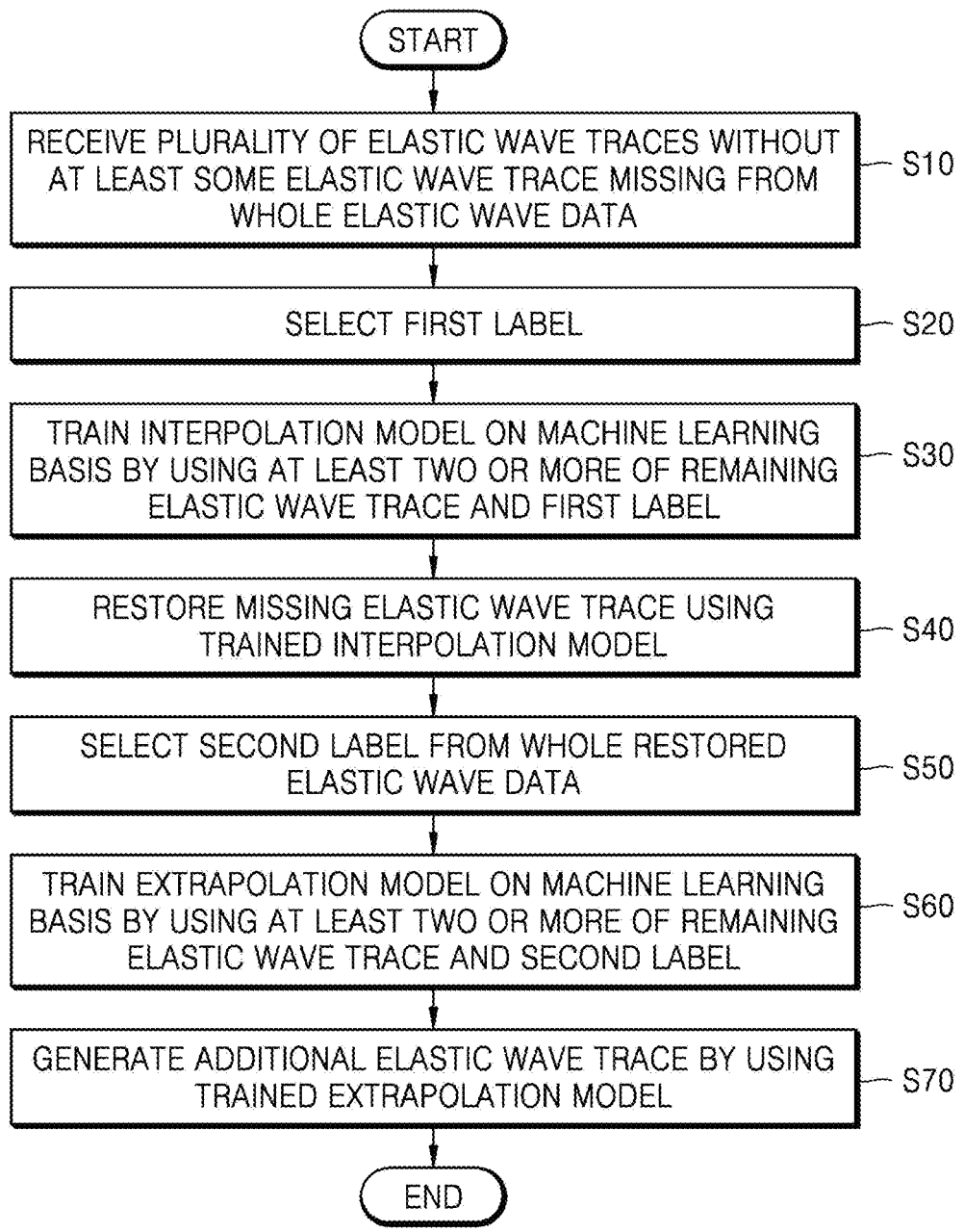
FIG. 3 is a flowchart of a method of processing elastic wave data, according to an embodiment of the disclosure.
Figure 4:
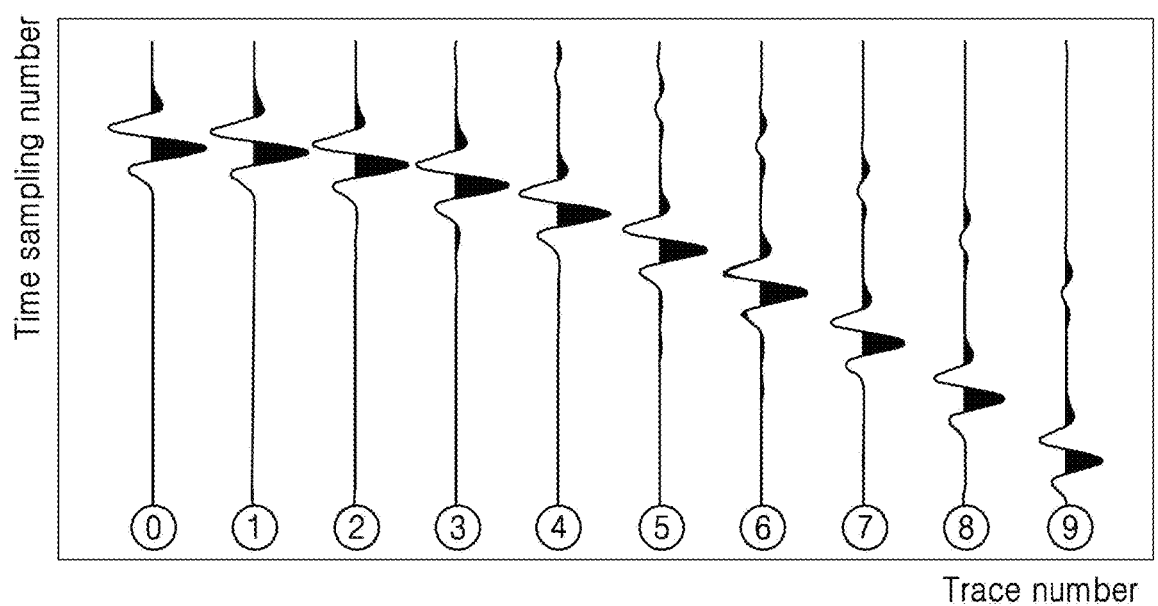
FIG. 4 shows a plurality of elastic wave traces included in whole elastic wave data, according to an embodiment of the disclosure.
Figure 5:
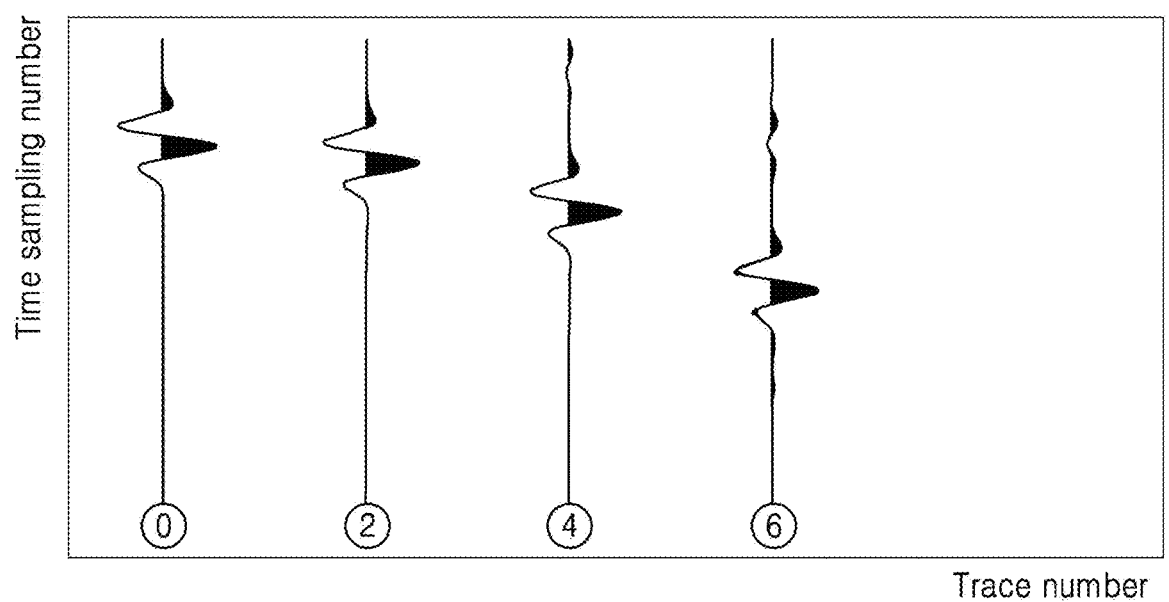
FIG. 5 shows a plurality of elastic wave traces received without some elastic wave traces missing from the whole elastic wave data of FIG. 4, according to an embodiment of the disclosure.
Figure 6:
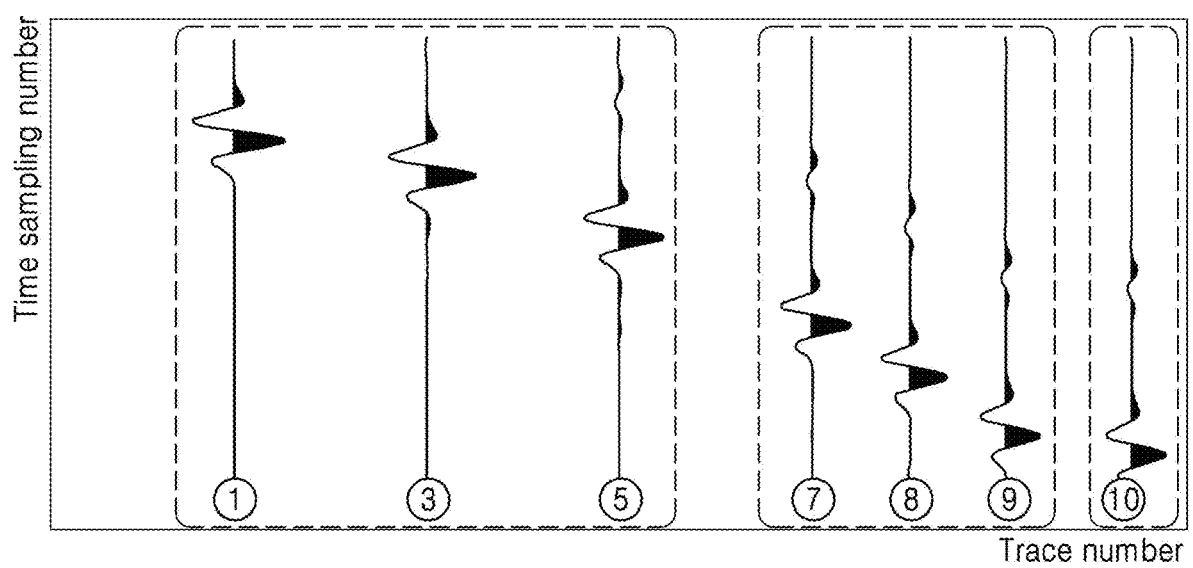
FIG. 6 shows a procedure of performing interpolation and extrapolation using the plurality of elastic wave traces of FIG. 5.

FIG. 3 is a flowchart of a method of processing elastic wave data, according to an embodiment of the disclosure. FIG. 4 shows a plurality of elastic wave traces included in whole elastic wave data, according to an embodiment of the disclosure. FIG. 5 shows a plurality of elastic wave traces received without some elastic wave traces missing from the whole elastic wave data of FIG. 4, according to an embodiment of the disclosure. FIG. 6 shows a procedure of performing interpolation and extrapolation using the plurality of elastic wave traces of FIG. 5.

Referring to FIGS. 1 to 3, the elastic wave trace receiving module 310 of the elastic wave processing device 300 may receive a plurality of elastic wave traces without at least some elastic wave traces missing from whole elastic wave data, in operation S10.

Referring to both FIGS. 4 and 5, the elastic wave trace receiving module 310 of the elastic wave processing device 300 may receive a plurality of elastic wave traces without at least some elastic wave traces (e.g., elastic wave traces 1, 3, 5, 7, 8, and 9) missing from the whole elastic wave data (e.g., elastic wave traces 0 to 9).

In this case, the elastic wave trace receiving module 310 of the elastic wave processing device 300 may receive data itself represented on a time (on the vertical axis)-space (on the horizontal axis) domain for the respective elastic wave traces. The vertical axis denotes a time axis with time sampling numbers, and the horizontal axis denotes a space axis with trace numbers.

Turning back to FIG. 3, the label selecting module 320 of the elastic wave processing device 300 may select some of the plurality of elastic wave traces received without at least some elastic wave traces missing from the whole elastic wave data as a first label, in operation S20.

Referring also to FIG. 5, the label selecting module 320 of the elastic wave processing device 300 may select some of the received plurality of elastic wave traces (e.g., elastic wave traces 0, 2, 4, and 6) as the first label.

In an embodiment of the disclosure, the label selecting module 300 of the elastic wave processing device 300 may determine the number of elastic wave traces to be selected as the first label based on the number of missing elastic wave traces. For example, the larger the number of the missing elastic wave traces, the larger number of elastic wave traces the label selecting module 320 may select as the first label.

In another embodiment of the disclosure, the label selecting module 300 of the elastic wave processing device 300 may select the first label based on a distance to each missing elastic wave trace. For example, the label selection module 320 may select the first label by giving higher priority to an elastic wave trace nearer to the missing elastic wave trace (e.g., elastic wave trace 1, 3, 5, 7, 8, or 9).

Turning back to FIG. 3, the interpolation model training module 332 of the elastic wave processing device 300 may train the interpolation model on a machine learning basis by using at least two or more of the remaining elastic wave traces except for the elastic wave traces selected as the first label in the operation S20, and the first label selected in the operation S20, in operation S30.

The interpolation model training process in the operation S30 will be described later in connection with FIG. 7.

The elastic wave trace restoring module 340 of the elastic wave processing device 300 may restore the missing elastic wave traces using the interpolation model trained in the operation S30, in operation S40.

Referring also to FIG. 6, the elastic wave trace restoring module 340 of the elastic wave processing device 300 may restore missing elastic wave traces (e.g., elastic wave traces 1, 3, 5, 7, 8, and 9) by using the trained interpolation model.

In an embodiment of the disclosure, the elastic wave trace restoring module 340 of the elastic wave processing device 300 may restore the missing elastic wave traces by using a trained extrapolation model. In this case, some of the missing elastic wave traces (e.g., elastic wave traces 7, 8, and 9) may be restored by using the trained extrapolation model.

In an embodiment of the disclosure, the elastic wave trace restoring module 340 of the elastic wave processing device 300 may restore missing elastic wave traces by selecting at least one of the interpolation model or the extrapolation model based on a pattern of locations of the missing elastic wave traces.

In another embodiment of the disclosure, the elastic wave trace restoring module 340 of the elastic wave processing device 300 may restore the elastic wave traces by using both the interpolation model and the extrapolation model. For example, for a certain missing elastic wave trace, the elastic wave trace restoring module 340 of the elastic wave processing device 300 may finally restore the elastic wave trace by reflecting respective weights for the elastic wave trace restored by using the interpolation model and the elastic wave trace restored by using the extrapolation model. In this case, the weights may be determined according to an extent of succession of the missing elastic wave traces. For example, as the number of successively missing neighboring elastic wave traces increases, the weight for the elastic wave traces restored using the extrapolation model may be higher.

Turning back to FIG. 3, the label selecting module 320 of the elastic wave processing device 300 may select the second label from the whole restored elastic wave data.

Referring also to FIG. 4, the whole restored elastic wave data may include a plurality of elastic wave traces (e.g., elastic wave traces 0 to 9), and the label selecting module 320 may select the second label from among the plurality of elastic wave traces (e.g., elastic wave traces 0 to 9).

In an embodiment of the disclosure, the label selecting module 320 of the elastic wave processing device 300 may select the second label based on a location of an elastic wave trace to be generated by an extrapolation model. For example, when an elastic wave trace to be generated (e.g., elastic wave trace 10) is located on the right side of the whole elastic wave data, e.g., on the right of elastic wave trace 9, the elastic wave trace adjacent to the elastic wave trace 9 may be selected as the second label.

Turning back to FIG. 3, the extrapolation model training module 334 of the elastic wave processing device 300 may train the extrapolation model on a machine learning basis by using at least two or more of the remaining elastic wave traces except for the elastic wave traces selected as the second label in the operation S50, and the second label selected in the operation S50, in operation S60.

The extrapolation model training process in the operation S60 will be described later in connection with FIG. 8.

The additional elastic wave trace generating module 350 of the elastic wave processing device 300 may additionally generate elastic wave traces that have not been included in the whole elastic wave data by using the extrapolation model trained in the operation S60, in operation S70.

Referring also to FIG. 6, the additional elastic wave trace generating module 350 may generate an additional elastic wave trace (e.g., elastic wave trace 10) that has not been included in the whole elastic wave data (elastic wave traces 0 to 9).

In an embodiment of the disclosure, the additional elastic wave trace generating module 350 of the elastic wave processing device 300 may generate an additional elastic wave trace by using an interpolation model trained in the operation S30. For example, an additional elastic wave trace may be generated between the elastic wave traces 0 and 1 by putting in the elastic wave traces 0 and 1 as input values for the interpolation model. In this case, the elastic wave processing device 300 may generate an additional elastic wave trace by using the interpolation model to prevent occurrence of spatial aliasing when receiver spacing is wide.

Figure 7:
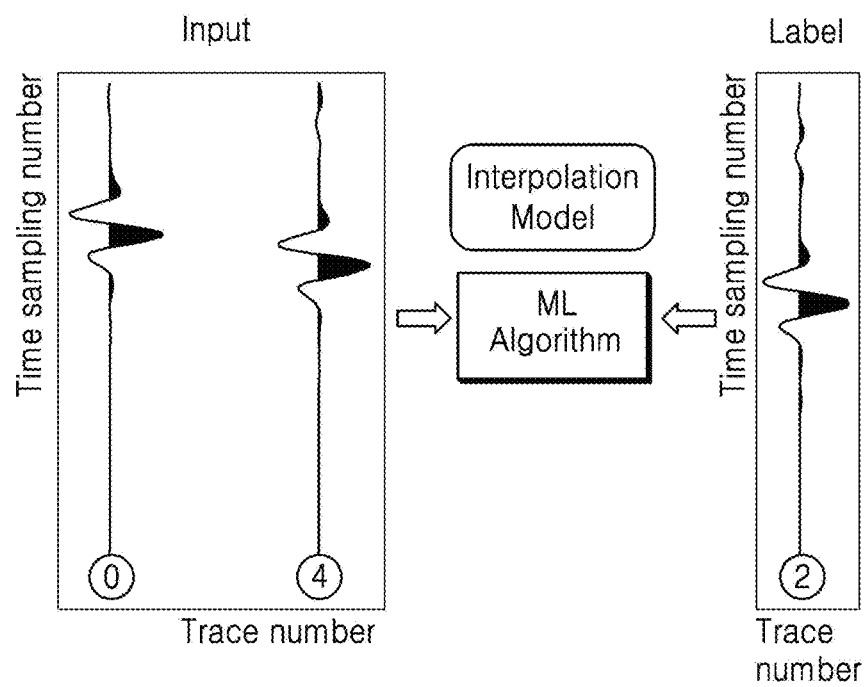
FIG. 7 is a diagram for describing a procedure of training an interpolation model on a machine learning basis in the method of processing elastic wave data of FIG. 3.

FIG. 7 is a diagram for describing a procedure of training an interpolation model on a machine learning basis in the method of processing elastic wave data of FIG. 3.

Referring to FIGS. 3 and 7, assume an occasion when elastic wave trace 2 is selected as the first label and of the remaining elastic wave traces except for the first label, e.g., 0, 4, and 6, elastic wave traces 0 and 4 are used in machine learning of the interpolation model.

In this case, elastic wave traces 0, 2, and 4 may all be selected from among non-missing elastic wave traces.

The interpolation model training module 332 of FIG. 2 may train the interpolation model on a machine learning basis by putting in elastic wave traces 0 and 4 as input values of a machine learning algorithm (ML algorithm) and applying elastic wave trace 2 as a label on the ML algorithm.

In an embodiment of the disclosure, the interpolation model training module 332 may train the interpolation model on a machine learning basis by using values at points having the same phase in the elastic wave traces 0 and 4 and the first label, i.e., values at points having the corresponding phase in the elastic wave trace 2. In this case, the same phase may refer to the same time sampling number. The interpolation model training module 332 may repeatedly perform the machine learning procedure by keeping changing the phase to be subject to training.

Alternatively, the interpolation model training module 332 may train a separate interpolation model to be applied to each missing elastic wave trace on the machine learning basis. In this case, the elastic wave restoring module 340 may restore each elastic wave trace by applying a different interpolation model to the missing elastic wave trace.

Alternatively, the interpolation model training module 332 may train the interpolation model on the machine learning basis based on a pattern of locations where the missing elastic wave traces are. In this case, the first label may be set to correspond to locations where the elastic wave traces are.

For example, when elastic wave traces 2 and 3 are missing from the whole elastic wave traces 0 to 9, the pattern of locations including the missing elastic wave traces and adjacent elastic wave traces may be determined as {normal, missing, missing, normal}. The interpolation model may be trained on a machine learning basis by selecting elastic wave traces 5 and 6 as the first label from among the non-missing elastic wave traces to correspond to the pattern of locations of the missing elastic wave traces, and forming a pattern of {input, label, label, input} with adjacent elastic wave traces 4 and 7 as input values.

Figure 8:
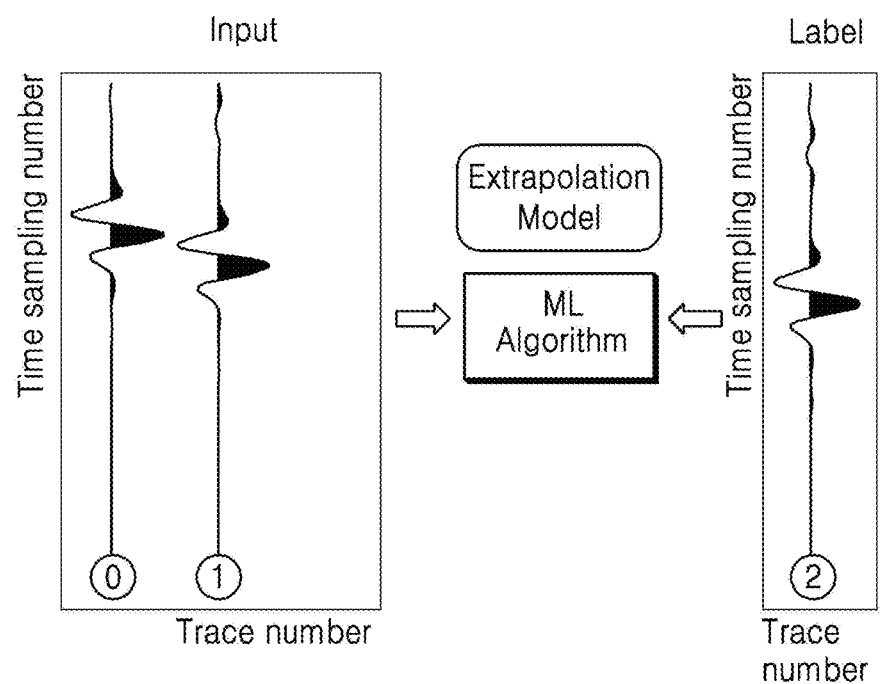
FIG. 8 is a diagram for describing a procedure of training an extrapolation model on a machine learning basis in the method of processing elastic wave data of FIG. 3.

FIG. 8 is a diagram for describing a procedure of training an extrapolation model on a machine learning basis in the method of processing elastic wave data of FIG. 3.

Referring to FIGS. 3 and 8, assume an occasion when elastic wave trace 2 is selected as the second label and of the remaining elastic wave traces except for the second label, elastic wave traces 0 and 1 are used in machine learning of the extrapolation model.

In this case, elastic wave traces 0, 1, and 2 may all be selected from among non-missing elastic wave traces or the restored elastic wave traces.

The extrapolation model training module 334 of FIG. 2 may train the extrapolation model on a machine learning basis by putting in elastic wave traces 0 and 1 as input values of an ML algorithm and applying elastic wave trace 2 as a label on the ML algorithm.

In an embodiment of the disclosure, the extrapolation model training module 334 may train the extrapolation model on a machine learning basis by using values at points with the same phase in the elastic wave traces 0 and 1 and the second label, i.e., values at points having the corresponding phase in the elastic wave trace 2. In this case, the same phase may refer to the same time sampling number. The extrapolation model training module 334 may repeatedly perform the machine learning procedure by keep changing the phase to be subject to training.

Figure 9:
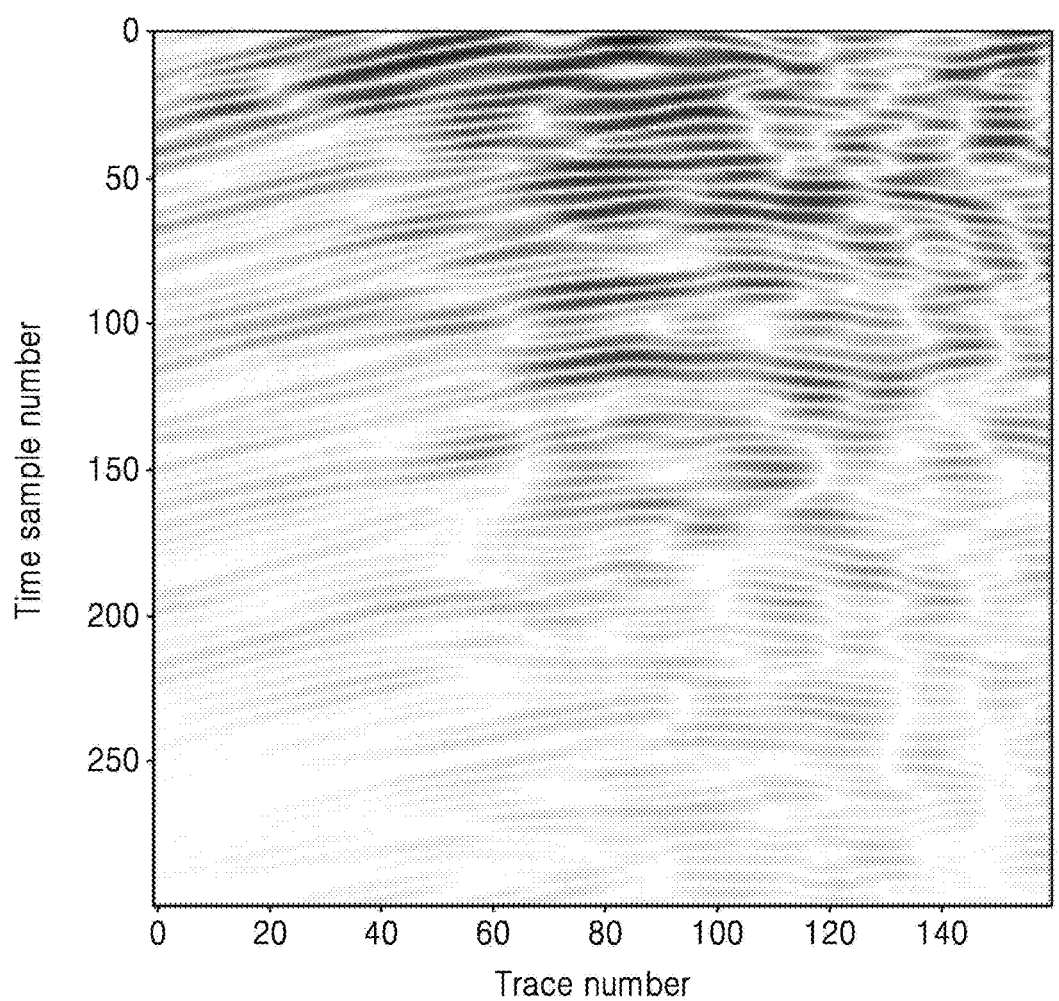
FIG. 9 is an original copy of elastic wave data, according to an embodiment of the disclosure.
Figure 10:
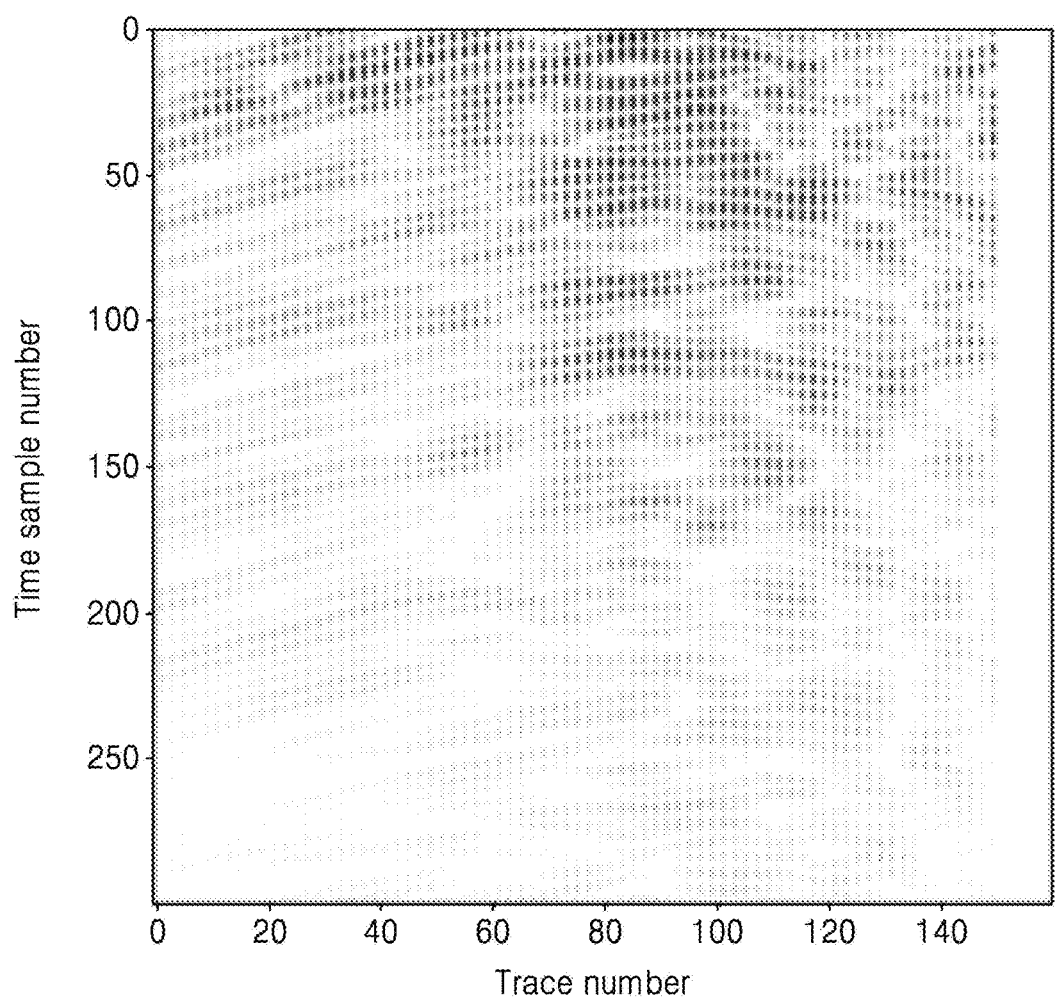
FIG. 10 shows an example of elastic wave data without a portion removed from the whole elastic wave data of FIG. 9.
Figure 11:
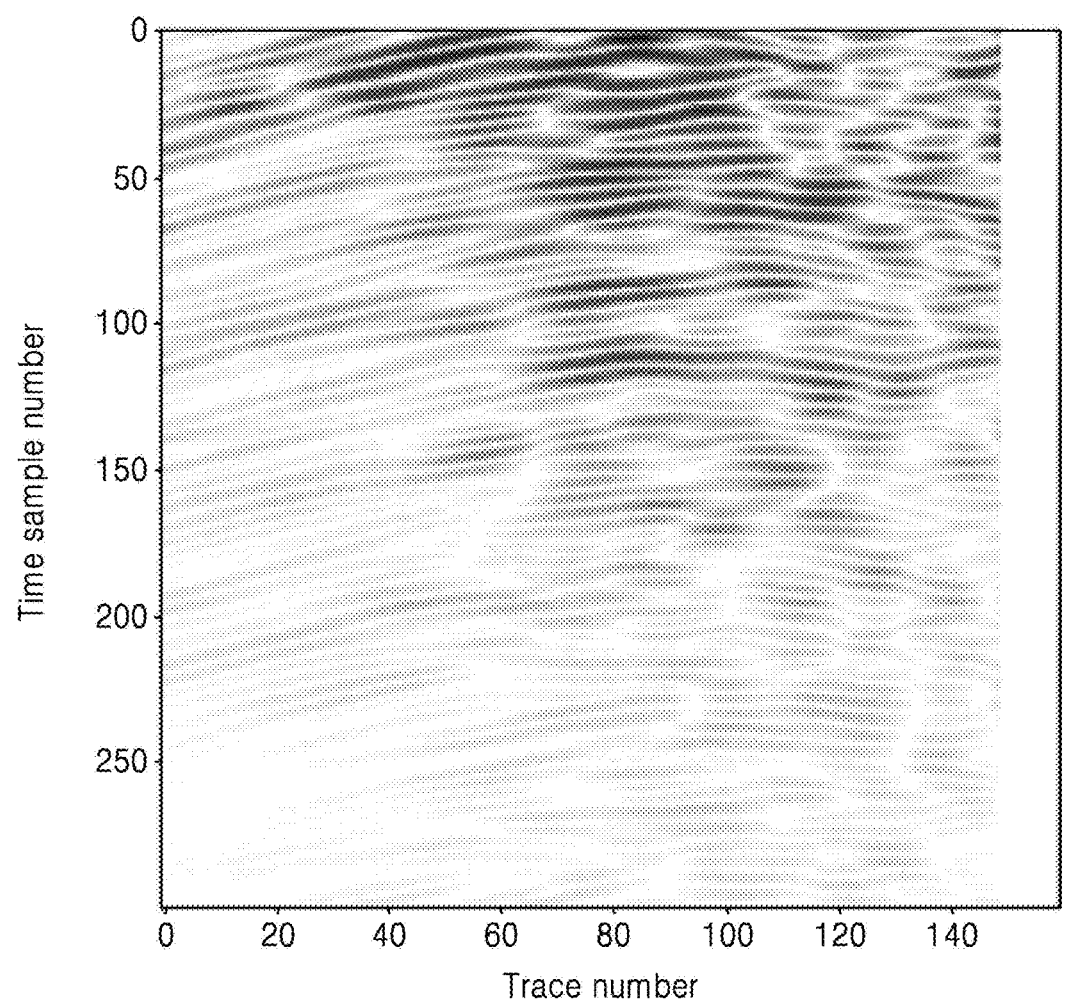
FIG. 11 shows elastic wave data with some elastic wave traces, that had been removed as shown in FIG. 10, restored by an interpolation procedure in a method of processing elastic wave data, according to an embodiment of the disclosure.
Figure 12:
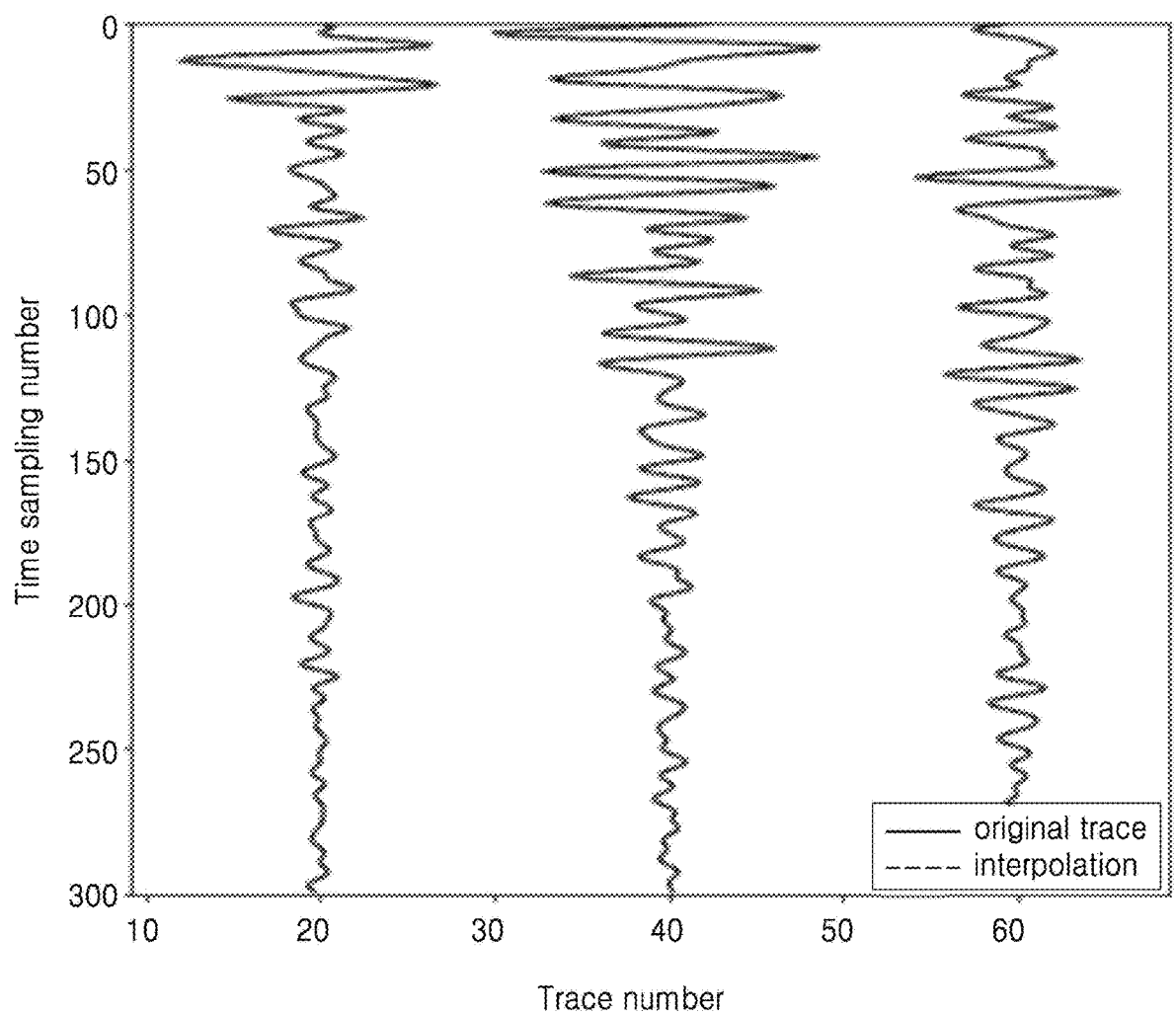
FIG. 12 shows comparison between elastic wave traces of the original copy of the elastic wave data and the elastic wave traces restored in FIG. 11.
Figure 13:
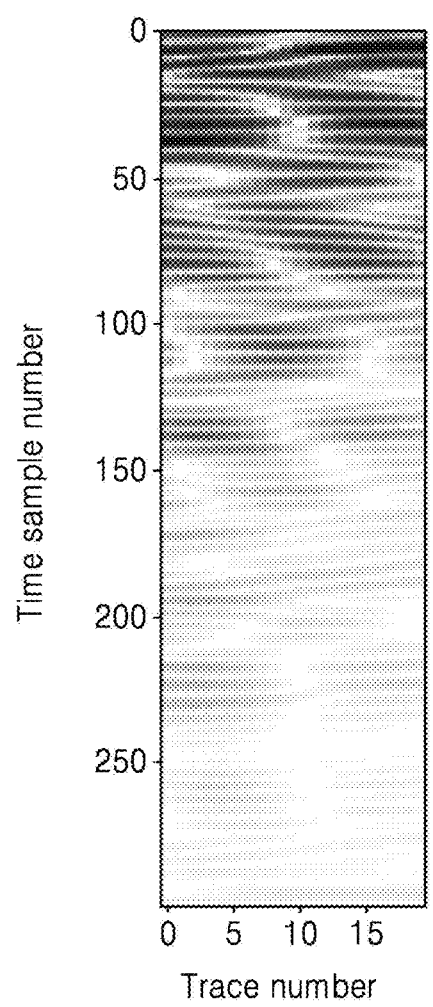
FIG. 13 shows elastic wave data with some elastic wave traces, that had been removed as shown in FIG. 10, restored by an extrapolation procedure in a method of processing elastic wave data, according to an embodiment of the disclosure.
Figure 14:
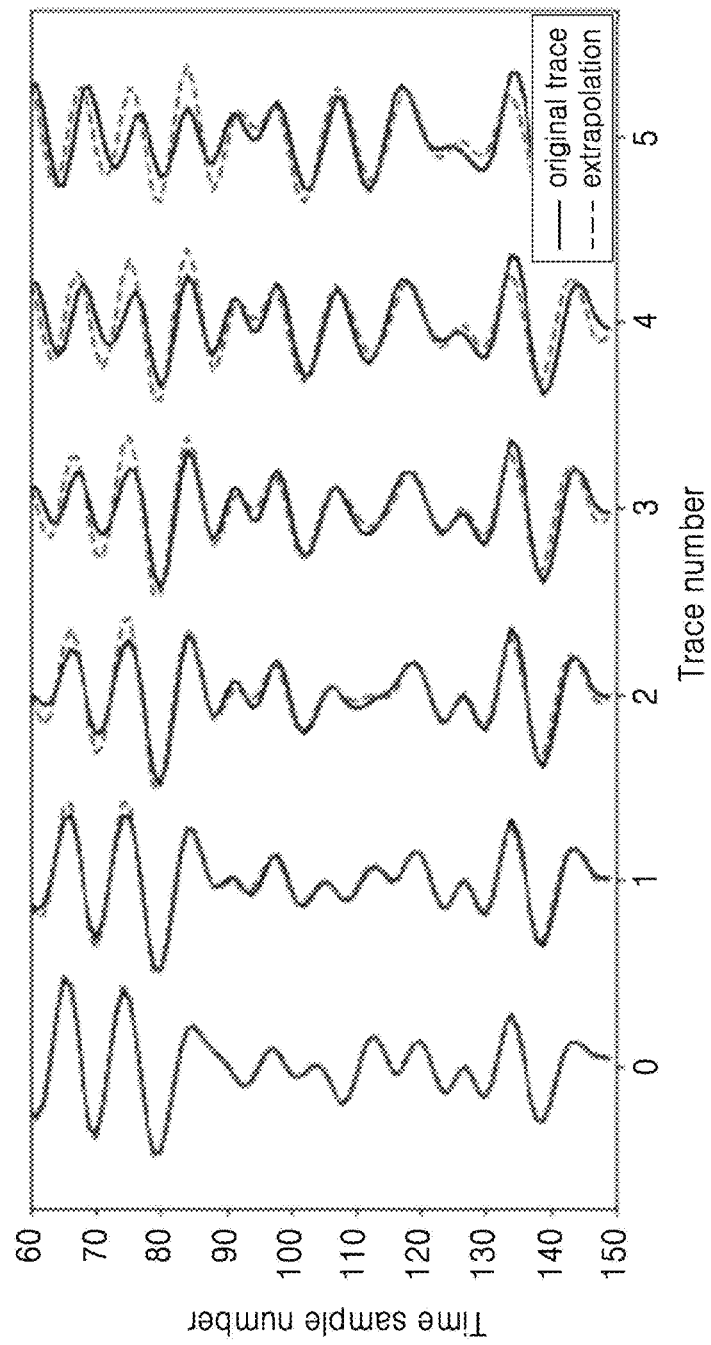
FIG. 14 shows comparison between elastic wave traces of the original copy of the elastic wave data and the elastic wave traces restored in FIG. 13.

FIG. 9 is an original copy of elastic wave data, according to an embodiment of the disclosure. FIG. 10 shows an example of elastic wave data without a portion removed from the whole elastic wave data of FIG. 9. FIG. 11 shows elastic wave data with some elastic wave traces, which were removed as shown in FIG. 10, restored by an interpolation procedure in a method of processing elastic wave data, according to an embodiment of the disclosure. FIG. 12 shows comparison between elastic wave traces of the original copy of the elastic wave data and the elastic wave traces restored in FIG. 11. FIG. 13 shows elastic wave data with some elastic wave traces, which were removed as shown in FIG. 10, restored by an extrapolation procedure in a method of processing elastic wave data, according to an embodiment of the disclosure. FIG. 14 shows comparison between elastic wave traces of the original copy of the elastic wave data and the elastic wave traces restored in FIG. 13.

Referring to FIG. 9, an example of an original copy of received elastic wave data is shown.

In FIG. 10, to test performance of a method of processing elastic wave data according to an embodiment of the disclosure, some of the elastic wave data are forced to be missing by forcing them to be removed from the original copy of the elastic wave data shown in FIG. 9, and the whole elastic wave data is assumed to have trace numbers up to 150.

Referring to FIG. 11, elastic wave data restored in the method of processing elastic wave data according to embodiments of the disclosure is shown, and it may be seen with a naked eye that the elastic wave data is restored to an almost the same extent as compared with the original copy of FIG. 9.

Referring to FIG. 12, three elastic wave traces are extracted from the elastic wave data of FIG. 11, and the elastic wave traces of the restored elastic wave data are compared with elastic wave traces of the original copy, in which case it may be seen that there is little error between them.

Referring to FIG. 13, elastic wave data additionally generated in a method of processing elastic wave data according to an embodiment of the disclosure is shown, and it may be seen that the additional elastic wave data is generated to a very similar extent as compared with the original copy of FIG. 9.

Referring to FIG. 14, five elastic wave traces are extracted from the elastic wave data of FIG. 13, and the elastic wave traces of the restored elastic wave data is compared with elastic wave traces of the original copy. Although accuracy is somewhat lowered as the additionally generated elastic wave trace is farther away from the original copy of the elastic wave data, it may be seen that a large portion of the additionally generated elastic wave trace follow the original elastic wave trace. Various embodiments of the disclosure have been described above, but those of ordinary skill in the art will understand and appreciate that the disclosure is not limited thereto and various modifications can be made without departing the scope of the disclosure.

The invention claimed is:

1. A method of processing elastic wave data, the method comprising:
   receiving a plurality of elastic wave traces included in whole elastic wave data, wherein at least one elastic wave trace of the whole elastic wave data is missing in the received plurality of elastic wave traces;
   selecting some elastic wave traces as at least one first label from among the plurality of elastic wave traces;
   training an interpolation model on a machine learning basis by using the at least one first label and at least first two or more elastic wave traces among remaining elastic wave traces except for the some elastic wave traces that are selected as the at least one first label;
   restoring the whole elastic wave data including the missing at least some elastic wave traces by using the trained interpolation model,
   wherein the interpolation model is configured to:
   determine a first difference in phase between the at least one first label and the at least first two or more elastic wave traces, and
   generate at least some elastic wave traces by applying the first difference to the restored missing at least some elastic wave traces;
   training an extrapolation model on a machine learning basis by using at least one elastic wave trace selected as at least one second label from among a plurality of elastic wave traces included in the restored whole elastic wave data and at least second two or more elastic wave traces among remaining elastic wave traces in the restored whole elastic wave data except for the at least one elastic wave trace that is selected as the at least one second label; and
   generating an additional elastic wave trace, which has not been included in the whole elastic wave data, by using the trained extrapolation model, and
   wherein the extrapolation model is configured to:
   determine a second difference in phase between the at least one second label and the at least second two or more elastic wave traces, and
   generate the additional elastic wave trace by applying the second difference.

2. The method of claim 1, wherein the interpolation model and the extrapolation model are trained based on a machine learning basis by using data itself represented on a time-space domain for each of the plurality of elastic wave traces.

3. The method of claim 1, further comprising:
   repeatedly training the interpolation model on a machine learning basis by using a plurality of elastic wave traces included in the restored whole elastic wave data.

4. The method of claim 1, wherein the training of the interpolation model by using the at least one first label comprises:
determining a number of elastic wave traces to be selected as the at least one first label based on a number of the at least some elastic wave traces missing from the whole elastic wave data, and training the interpolation model on a machine learning basis by using the elastic wave traces selected as the at least one first label.

5. The method of claim 4, wherein the repeatedly training of the interpolation model comprises:
setting a number of elastic wave traces to be selected as the at least one first label to be larger as the number of the at least some elastic wave traces missing from the whole elastic wave data increases.

6. The method of claim 1, wherein the training of the interpolation model comprises
training the interpolation model on a machine learning basis by using the at least one first label and values at points having a same phase in the at least two or more of the remaining elastic wave traces except for the at least one first label.

7. The method of claim 6, wherein the machine learning is performed by using a recurrent neural network (RNN) or long short-term memory (LSTM) model.

8. The method of claim 1, wherein the selecting of the some elastic wave traces as the at least one first label comprises:
selecting the some elastic wave traces as the at least one first label based on a distance to the at least some elastic wave trace missing from the whole elastic wave data.

9. The method of claim 1, wherein the selecting of the some elastic wave traces as the at least one first label comprises:
selecting the some elastic wave traces as the at least one first label among the whole elastic wave data by applying a high priority as elastic wave trace that are closer in distance from the elastic wave trace missing.

10. The method of claim 1, wherein the training of the extrapolation model comprises:
selecting some of the plurality elastic wave traces included in the restored whole elastic wave data as the at least one second label, based on a location of an elastic wave trace to be generated by the extrapolation model.

11. The method of claim 1, further comprising:
restoring the at least some elastic wave traces missing from the whole elastic wave data, by using the extrapolation model.

12. The method of claim 1, wherein the restoring of the at least some elastic wave traces missing from the whole elastic wave data comprises
restoring the at least some elastic wave traces missing from the whole elastic wave data, by using both the interpolation model and the extrapolation model.

13. An apparatus for processing elastic wave data, the apparatus comprising at least one processor configured to:
receive a plurality of elastic wave traces included in whole elastic wave data, wherein at least one elastic wave trace of the whole elastic wave data is missing in the received plurality of elastic wave traces;
select some elastic wave traces as at least one first label from among the plurality of elastic wave traces;
train an interpolation model on a machine learning basis by using the at least one first label and at least first two or more remaining elastic wave traces among remaining elastic wave traces except for the some elastic wave traces that are selected as the at least one first label;
restore the whole elastic wave data including the missing at least some elastic wave traces by using the trained interpolation model,
wherein the interpolation model is configured to:
determine a first difference in phase between the at least one first label and the at least first two or more elastic wave traces, and
generate at least some elastic wave traces by applying the first difference to the restored missing at least some elastic wave traces;
train an extrapolation model on a machine learning basis by using at least one elastic wave trace selected as at least one second label from among a plurality of elastic wave traces included in the restored whole elastic wave data and at least second two or more elastic wave traces among remaining elastic wave traces in the restored whole elastic wave data except for the at least one elastic wave trace that is selected as the at least one second label; and
generate an additional elastic wave trace, which have not been included in the whole elastic wave data, by using the trained extrapolation model, and
wherein the extrapolation model is configured to:
determine a second difference in phase between the at least one second label and the at least second two or more elastic wave traces; and
generate the additional elastic wave trace by applying the second difference.

14. A non-transitory computer-readable medium storing a program for managing a device thereon, wherein the program, when executed by a controller of a device, cause the device to:
receive a plurality of elastic wave traces included in whole elastic wave data, wherein at least one elastic wave trace of the whole elastic wave data is missing in the received plurality of elastic wave traces;
select some elastic wave traces as at least one first label from among the plurality of elastic wave traces;
train an interpolation model on a machine learning basis by using the at least one first label and at least first two or more elastic wave traces among remaining elastic wave traces except for the some elastic wave traces that are selected as the at least one first label;
restore the whole elastic wave data including the missing at least some elastic wave traces by using the trained interpolation model,
wherein the interpolation model is configured to:
determine a first difference in phase between the at least one first label and the at least first two or more elastic wave traces;
generate at least some elastic wave traces by applying the first difference to the restored missing at least some elastic wave traces;
train an extrapolation model on a machine learning basis by using an at least one elastic wave trace selected as at least one second label from among a plurality of elastic wave traces included in the restored whole elastic wave data and at least second two or more elastic wave traces among remaining elastic wave traces in the restored whole elastic wave data except for the at least one elastic wave trace that is selected as the at least one second label; and
generate an additional elastic wave trace, which have not been included in the whole elastic wave data, by using the trained extrapolation model, and wherein the extrapolation model is configured to:
determine a second difference in phase between the at least one second label and the at least second two or more elastic wave traces; and
generate the additional elastic wave trace by applying the second difference.

* * * * *